United States Patent [19]

Matthews

[11] 3,760,036
[45] Sept. 18, 1973

[54] PVA LUBRICANT FOR POLYVINYL CHLORIDE
[75] Inventor: Stephen B. Matthews, Waynesboro, Va.
[73] Assignee: Reynolds Metals Company, Richmond, Va.
[22] Filed: Apr. 12, 1972
[21] Appl. No.: 243,474

[52] U.S. Cl........ 260/899, 260/23.5 R, 260/28.5 D, 260/31.8 M, 264/210, 264/288, 264/289
[51] Int. Cl. ............................................ C08f 29/24
[58] Field of Search.......................... 260/899, 28.5; 264/211

[56] References Cited
UNITED STATES PATENTS
2,682,484   6/1954   Thomas .......................... 260/899 X
2,384,884   9/1945   Britton et al..................... 260/899 X
3,293,202   12/1966   Weisman .......................... 260/32.8

Primary Examiner—John C. Bleutge
Assistant Examiner—C. J. Seccuro
Attorney—John F. C. Glenn et al.

[57] ABSTRACT

The heat seal characteristics of extruded oriented polyvinyl chloride film are improved by the addition of low molecular weight polyvinyl acetate homopolymers to a conventional extrusion mix and thereafter carrying out extrusion operations.

8 Claims, No Drawings

PVA LUBRICANT FOR POLYVINYL CHLORIDE

DESCRIPTION OF THE PRIOR ART

Polyvinyl chloride polymers are extremely well known in the art and, in fact, have found great acceptance for a wide variety of uses including the manufacture of polyvinyl chloride films. An extremely important method for preparation of polyvinyl chloride films which is employed commercially today involves so-called extrusion processes. In processes of this type, polyvinyl chloride together with conventional additives is forced through a die or other restrictive orifice to yield films having desired characteristics. It is also well known in the art that in the extrusion of polyvinyl chloride films, it is necessary to employ lubricants to reduce the frictional heat generation in the prefused and molten compound, as well as to reduce melt viscosity and melt temperature and to enhance the smooth melt flow and prevent sticking and burning on the internal parts of the extruder. There are many lubricants known in the art which admirably accomplish all of the above objectives. However, a particular problem arises when attempting to manufacture polyvinyl chloride films which are clear or transparent in that although the lubricant is desirable during the extrusion phase of the operation, in general, it is undesirable in the finished product.

The reason why lubricants can generally be stated to be undesirable in the finished films is due to the fact that in order for lubricants to function effectively, they must be completely or partially incompatible with the polymer, i.e., the particular lubricant must be able to migrate through the polymer in order to provide the lubricity which is necessary in the extruding operation. However, as has heretofore been stated, although this property is deemed to be essential during the extrusion operation, nevertheless, certain problems do arise once the final film has been produced. It has been discovered that conventional lubricants tend to migrate to the surface of the finished film and their presence can adversely affect several desirable film properties, particularly in clear polyvinyl chloride films. One of the more critical properties which is adversely affected by the heretofore employed lubricants is the heat seal range which is defined as the temperature span over which two layers of the film will fuse without melting. Conventional lubricants migrate to the film surface forming a heat barrier to the heat seal, thereby severely affecting the heat seal range.

Although the aforementioned migration of lubricants to the surface of the film does occur in all types of extruded polyvinyl chloride films, its adverse effects do not become highlighted until the film is oriented by conventional techniques such as stretching. In a non-oriented film, the sites for migration are less and the subsequent effects do not appreciably narrow the heat seal range. However, there are many applications for polyvinyl chloride film which require that it be oriented in order to impart desirable characteristics to the film, particularly when it is desired to produce heat shrinkable film to be employed in conventional packaging operations. For reasons which are not completely understood, when a polyvinyl chloride film has been oriented by stretching, the problem of migration of the lubricant to the surface of the film becomes much more severe and experience has shown that it has an adverse effect on the heat seal characteristics of the desired material. In fact, it has been shown that the heat seal range of an oriented polyvinyl chloride film which initially is between 30°–40° F may be reduced to a range of 0°–10° F in a period of time of two months or less.

DESCRIPTION OF THE INVENTION

It has now been discovered that clear polyvinyl chloride films can be produced by conventional extrusion techniques which will retain their initial heat seal characteristics after they have been oriented either uniaxially or biaxially by the inclusion in a conventional polyvinyl chloride extrusion formulation of a lubricant consisting essentially of a low molecular weight homopolymer of polyvinyl acetate. It has been found that the homopolymers of polyvinyl acetate provide the lubrication which is necessary during the extrusion operation without seriously affecting the characteristics of the finished polyvinyl chloride film. The reason why polyvinyl acetate homopolymers function in a manner to produce the outstanding results is not completely understood, but the simple fact remains that oriented extruded polyvinyl chloride films containing polyvinyl acetate as a lubricant do not have their heat seal characteristics adversely affected, and, in fact, in some cases it has been observed that the heat seal strength is actually improved over comparable films produced in the same manner but without the use of the novel lubricant of this invention.

This invention is conveniently practiced by adding small amounts of polyvinyl acetate to a conventional polyvinyl chloride extrusion formulation, said formulation containing polyvinyl chloride plus the conventional additives well known in the art. The amount of low molecular weight polyvinyl acetate which is incorporated into the polyvinyl chloride is governed by many factors which will be hereinafter set forth. As has heretofore been stated, the problem in the art has not been to provide a lubricant to avoid the problems during the extrusion operation, but rather, to provide a lubricant which would not create problems in the finished film. In this regard, it should be immediately apparent that in the manufacture of clear polyvinyl chloride films, it is necessary that the various additives conventionally used including lubricant do not impart a discoloration or a haziness to the final product. For this reason it has been found that the amount of polyvinyl acetate homopolymer which should be employed should range from 0.5 to about 2 weight percent based on the polyvinyl chloride resin. It should be immediately apparent that higher concentrations of polyvinyl acetate can be used if one considers merely the lubricating qualities of polyvinyl acetate. Thus, the higher the concentration of polyvinyl acetate, the greater will be the amount of lubrication which occurs during the extrusion operation. However, increasing amounts of polyvinyl acetate will affect the quality of the final film and tend to make it hazy which, in turn, limits its applicability in those packaging operations where a clear film is desired in order that the object being packaged will be visible without any adverse aesthetic effects. For this reason, it has been found that a maximum of 2 weight percent of the polyvinyl acetate should be used in order to avoid problems with regard to the clarity of the film. On the other hand, if less than about 0.5 weight percent of polyvinyl acetate is employed, sufficient lubrication will not be present during the extrusion operation.

The polyvinyl acetate homopolymers which are employed as lubricants for the production of polyvinyl chloride films in accordance with the teachings of this invention are well known in the art and are commercially available by a number of manufacturers. In general, polyvinyl acetate homopolymers can be produced so that the average molecular weight thereof ranges anywhere from about 4,300 to 100,000 and higher. Because of the difficulty of accurately measuring the molecular weight in the lower end of the molecular weight range, the art has refrained from ascribing numerical values of average molecular weight to these polymers. Instead the polyvinyl acetate art has developed such that molecular weights of the varying homopolymers are described by reference to the softening point of the particular homopolymer. In general, the higher the softening point, the higher the molecular weight of the polyvinyl acetate homopolymer. In accordance with the accepted method of description in the art, the homopolymers with which this invention is concerned are those which have a softening point (as determined by the modified ball and ring method) ranging from about 44° C to about 86.5° C and preferably from 60° to 70° C. A particularly preferred low molecular weight vinyl acetate homopolymer is one which has a softening point of 66° C. A material of this type is commercially available under the trade name "AYAA" (Union Carbide Corporation).

In a preferred embodiment of this invention, it is desired to use low molecular weight polyvinyl acetate homopolymers which have been mixed with approximately 5% of fine particle size polyvinyl chloride in order to minimize blocking. As is well known in the art, low molecular weight polyvinyl acetate homopolymers which are supplied in the form of pellets have a tendency to stick together due to blocking and sintering during storage, especially at temperatures above 70° F. Such phenomenon renders processing with this resin more difficult. In order to avoid the aforementioned problems of blocking and sticking, polyvinyl acetate homopolymer powders are admixed with about 5% by weight of a fine particle size polyvinyl chloride. A material of this type is also known in the art and is commercially available under the trade name "AYJV" (Union Carbide Corporation).

As has heretofore been stated, this invention is conveniently practiced by adding a low molecular weight polyvinyl acetate homopolymer to a conventional polyvinyl chloride extrusion mix, and then carrying out conventional extruding operations and conventional stretching or orientation operations. As is well known in the art, polyvinyl chloride extrusion mixes can contain a wide variety of additives to impart specific properties or characteristics to the finished polyvinyl chloride film. These additives include, for example, the use of plasticizers in order to decrease the inherent rigidity of the polyvinyl chloride. Typical plasticizers which are employed include tricresyl phosphate, dioctyl phthalate, dibutoxyethyl phthalate, dioctyl adipate, epoxidized soy bean oil, etc. Other additives conventionally employed include heat stabilizers, the most common ones being alkaline earth carbonates, hydroxides, oxides, and soaps. In addition, the extrusion formulation can contain dyes, pigments, diluent resins, fillers, etc.

To the above-described conventional polyvinyl chloride extrusion mix is added the low molecular weight polyvinyl acetate homopolymers previously described in amounts ranging from about 0.5 to about 2 weight percent and the extrusion formulation is usually mixed in order to assure uniform blending of all the additives.

The extrusion melt is thereafter forced through conventional extruding apparatus to produce the desired film and the film is thereafter stretched either uniaxially or biaxially in accordance with techniques well known in the art.

The following examples will illustrate the best mode contemplated for carrying out the invention.

EXAMPLE 1

A polyvinyl chloride extrusion melt was prepared by blending the following:
Polyvinyl chloride—100
Dioctyl Adipate—15
Epoxidized Soy Bean Oil—5
Butyl Tin Mercaptide—1.5
AYJV*—0.5

*A polyvinyl acetate homopolymer having a softening point of 66°C admixed with about 5 weight percent powdered polyvinyl chloride, marketed by Union Carbide Corporation.

The above was tumbled in a blender to about 250° F and thereafter tumbled in a cooling blender until the temperature dropped to about 100° F. It was then passed through a conventional blown film extruder to form polyvinyl chloride film. The extrusion opration was carried out smoothly with no sticking of the melt on the internal portions of the extruder thereby indicating the excellent lubricating properties of the polyvinyl acetate. The finished film is then stretched in both directions to approximately two and one-half times the original dimensions. The finished film is observed to have excellent heat seal characteristics which are not adversely affected upon storage.

EXAMPLE 2

The process of Example 1 is repeated with the exception that the polyvinyl acetate homopolymer employed is one which has a softening point of 86.5° C. A product of this type is marketed by Union Carbide Corporation under the designation AYAT. The results of this example indicate that excellent lubricating qualities are obtained during the extrusion operation and the oriented film has excellent heat seal characteristics.

EXAMPLE 3

The procedure of Example 1 is repeated with the exception that the polyvinyl chloride extrusion melt has the following composition:
Polyvinyl Chloride—100
Epoxidized Soy Bean Oil—21
Ethylene Bis Oleamide—0.23
AYJV*—0.75
Liquid Barium Cadmium Phosphite Heat Stabilizer—2.5

*A polyvinyl acetate homopolymer having a softening point of 66° C admixed with about 5 weight percent of polyvinyl chloride powder marketed by Union Carbide Corporation. The results of this example show that there is no problem with sticking of the melt on the internal parts of the extruder thereby indicating good lubrication qualities. The finished film after stretching in both directions shows excellent heat seal characteristics which do not substantially diminish over a period of time.

EXAMPLE 4

The procedure of Example 3 is repeated with the exception that AYAF is employed. This material is a polyvinyl acetate homopolymer having a softening point of 77.0° C and marketed by the Union Carbide Corporation.

The results of this example indicate that this particular polyvinyl acetate homopolymer works equally as well.

EXAMPLE 5

The procedure of Example 4 is repeated with the exception that AYAA is employed. This material is a polyvinyl acetate homopolymer having a softening point of 77.0° C and marketed by the Union Carbide Corporation.

The results of this example indicate that this particular polyvinyl acetate homopolymer works equally as well.

The polyvinyl acetate homopolymers marketed by Union Carbide Corporation are more fully described in Vinyl and Related Polymers, by Calvin Schneldknecht (1952), Johns Wiley and Sons, page 337.

What is claimed is:

1. In the process for the preparation of polyvinyl chloride films wherein a polyvinyl chloride melt is passed through an extruder, the improvement which comprises adding to said melt a low molecular weight polyvinyl acetate homopolymer in amounts ranging from 0.5 to about 2.0 weight percent based on the polyvinyl chloride.

2. The process of claim 1 wherein the low molecular weight polyvinyl acetate homopolymer has a softening point of from about 44° to about 86.5° C.

3. The process of claim 2 wherein the low molecular weight polyvinyl acetate homopolymer has a softening point of from about 60°–70° C.

4. The process of claim 2 wherein the polyvinyl chloride film is subjected to stretching operations.

5. The process of claim 3 wherein the low molecular weight polyvinyl acetate homopolymer contains about 5 weight percent of finely divided polyvinyl chloride.

6. An extruded biaxially or uniaxially oriented polyvinyl chloride film containing from about 0.5 to about 2.0 weight percent of a low molecular weight polyvinyl acetate homopolymer.

7. The film of claim 6 wherein the low molecular weight polyvinyl acetate homopolymer has a softening point of from about 44° to about 86.5° C.

8. The film of claim 6 wherein the low molecular weight polyvinyl acetate homopolymer has a softening point of from about 60-70°C.

* * * * *